Feb. 20, 1934.  C. B. THOMPSON  1,947,887
BRAKE BAND
Filed July 21, 1930
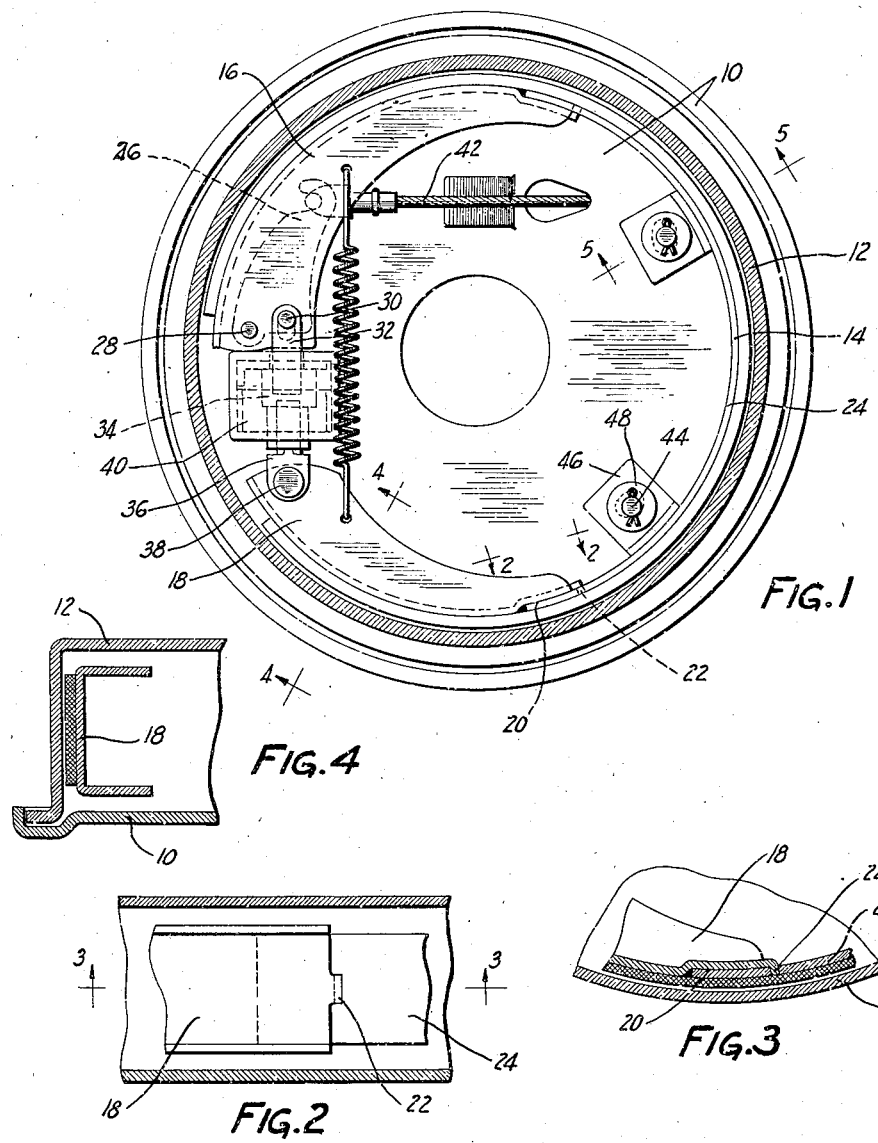
INVENTOR.
CARL B. THOMPSON
BY H. O. Clayton
ATTORNEY Patented Feb. 20, 1934

1,947,887

UNITED STATES PATENT OFFICE 1,947,887

BRAKE BAND

Carl B. Thompson, South Bend, Ind., assignor to Bendix Brake Company, South Bend, Ind., a corporation of Illinois Application July 21, 1930. Serial No. 469,464

3 Claims. (Cl. 188—250)

This invention relates to brakes in general and more particularly to the band type of internal expanding automotive brake readily adapted to the four wheel braking systems now extensively in use in this art.

It is a prime desideratum that the band type of friction element be simple of fabrication, light of weight, yet withal very strong to withstand the rigors incident to its service. To that end, therefore, I have designed ways and means for the fabrication of the band element of this type of brake and suggest that the same be built up of a plurality of stampings shaped to provide two preformed curved channel-shaped end pieces joined by a preformed curved bandlike segment, the latter rigidly secured at its ends to the ends of the channel pieces.

While the foregoing statement is indicative in a general way of the objects of the invention, other objects and advantages not specifically referred to in this disclosure will be obvious upon a full understanding of the friction element referred to herein and the method of forming the same as set forth in the following description and accompanying drawing, wherein is presented what is now considered to be a preferred embodiment of the invention. It will be understood, however, that this particular embodiment is chosen primarily for the purpose of exemplification and is not intended either to restrict in any way the spirit of the invention or to limit unnecessarily the scope of the appended claims.

In the drawing:

Figure 1 is an elevational view of an internal expanding brake embodying my novel band friction element therein;

Figure 2 is a fragmentary view disclosing in bottom plan the detail of the connection between parts of my novel band;

Figure 3 is a fragmentary longitudinal section through the connection disclosed in Figure 2 taken on the line 3—3 thereof;

Figure 4 is a transverse section through one of the end pieces of the band, the section being taken on the line 4—4 of Figure 1; and Figure 5 is a section taken on the line 5—5 of Figure 1 disclosing in detail the combined steady rest and guide for the band.

Referring now in detail to the drawing, particularly Figure 1 thereof, there is disclosed a brake assembly of the type more completely disclosed and described in the co-pending application of A. Y. Dodge, No. 469,522, filed July 21, 1930. This brake assembly, in brief, comprises the conventional brake support plate 10 usually mounted directly on the king pin or knuckle structure of a front swiveled wheel (not shown) or to the axle housing of a rear wheel, which support plate lies within the confines of the usual rotatable brake drum 12 secured to the wheel of the vehicle.

Exclusive of the band, the remainder of the elements of this brake assembly, which, as previously pointed out, form no part of this invention, comprises preferably an operating means including a lever member 26 pivoted to the end of the end piece 16 at 28, which lever is further pivoted at 30 to a thrust member 32, the end of the latter fitting within a recess in a nut 34. The nut 34 is threadedly mounted on one end of a thrust clevis bolt 36 pivoted at its end 38 to the remaining end piece 18. The major portion of the operating means and adjusting means just described is housed within a box shaped anchor member 40 rigidly secured to the brake support plate 10.

The aforementioned lever is adapted to be actuated by a flexible operating cable member 42 and the assembly is completed by the guide and positioning structure disclosed in Figure 5, preferably comprising a pin 44 secured to and projecting from the support plate 10, said pin projecting at its end within a slot in the inwardly directed flange of a bracket member 46 secured to the inner face of the intermediate connecting segment 24. Washers 48 sleeved over the aforesaid pin 44 serve to confine the band member laterally during its operative and release movement by means of a compression spring 50 interposed between said washers and the support plate 10.

The brake assembly disclosed further includes my novel annular bandlike friction element 14 adapted to receive on its outer or rim face any one of the conventional types of friction material or better known as brake lining and this invention is directed wholly to the technic of fabrication of the band 14 and the product resulting therefrom. In order to obviate waste of material and provide an extremely simple and yet strong band, I have suggested first that end pieces 16 and 18 be fashioned from plain sheet steel stock into the channel-shaped members disclosed and clearly indicated in section in Figure 4 and in elevation in Figure 1. The sides or webs of the channel members are preferably tapered in width, as disclosed, to thus decrease the strength thereof from one end to the other. This results in a progressively varying flexibility of the entire friction band. The more flexible of the ends of said channel-shaped end pieces 16 and 18 are then preferably pressed inwardly approximately the thickness of the stock of the rim to provide recesses 20, the rim stock then being fashioned at the end thereof to provide an outwardly extending lug portion 22. The lug portions facilitate the assembly of the band parts.

The next step in the process of building up the friction band comprises preforming from a relatively narrow gauge strip or ribbonlike steel stock the curved connector segment 24 disclosed in its entirety in Figure 1, which segment is fashioned at its ends with openings or slots to receive the outwardly projecting lugs 22 of the end pieces 16 and 18. The ends of the segment 24 are further positioned within the recesses 20 in the ends of the end pieces, thus completing the bandlike friction element. I prefer to weld the segment 24 to the end pieces within the aforementioned recesses, as indicated by the crosses in Figure 1.

A considerable saving of material is thus effected by this method of fabrication, for there is obviously no waste of material such as might be incurred, should the article disclosed be formed from one integral piece of stock, which would necessitate cutting away of the side flanges to provide the plain unreinforced connecting member 24.

While one illustrative embodiment has been described in detail, it is not my intention to limit the invention to that particular embodiment or otherwise than by the terms of the appended claims.

I claim:

1. A brake structure comprising an annular band type friction element fabricated of a curved stamping presenting an imperforate brake lining support member, and reinforced rim portions having recessed ends receiving the ends of said curved stamping.

2. A brake structure comprising an annular band type friction element fabricated of a curved stamping presenting an imperforate brake lining support member, and a reinforced channel-section end member having a rim with a recess at its end receiving the end of the stamping.

3. A brake structure including a bandlike friction element comprising channel-shaped end pieces each recessed at one of its ends and housing therein the ends of a preformed band segment, each of said end pieces being further provided with a securing lug interfitting with an opening in each end of said connecting band.

CARL B. THOMPSON.